United States Patent
Duclos

(10) Patent No.: US 8,770,961 B2
(45) Date of Patent: Jul. 8, 2014

(54) MOLDING DEVICE PROVIDED WITH A CONTROLLED MEANS FOR CLAMPINGLY ATTACHING A HALF-MOLD BY MEANS OF SLIDABLE ATTACHMENT BOLTS

(75) Inventor: Yves-Alban Duclos, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 78 days.

(21) Appl. No.: 13/391,499

(22) PCT Filed: Aug. 31, 2010

(86) PCT No.: PCT/EP2010/062675
§ 371 (c)(1), (2), (4) Date: Feb. 21, 2012

(87) PCT Pub. No.: WO2011/026828
PCT Pub. Date: Mar. 10, 2011

(65) Prior Publication Data
US 2012/0148703 A1    Jun. 14, 2012

(30) Foreign Application Priority Data
Sep. 7, 2009   (FR) ..................................... 09 56080

(51) Int. Cl.
*B29C 33/30* (2006.01)
(52) U.S. Cl.
USPC ........................................................ 425/195
(58) Field of Classification Search
USPC ..................... 425/192 R, 195, 541
See application file for complete search history.

(56) References Cited

U.S. PATENT DOCUMENTS

| | | | |
|---|---|---|---|
| 5,968,560 A | 10/1999 | Briere et al. | |
| 6,428,302 B1 * | 8/2002 | Tsau | 425/195 |
| 6,464,486 B1 | 10/2002 | Barray et al. | |
| 6,948,924 B2 * | 9/2005 | Tsau et al. | 425/195 |
| 7,258,538 B2 * | 8/2007 | Miller | 425/195 |
| 7,887,315 B2 * | 2/2011 | Lane | 425/195 |
| 8,038,429 B2 * | 10/2011 | Linke et al. | 425/195 |

(Continued)

FOREIGN PATENT DOCUMENTS

| | | |
|---|---|---|
| DE | 101 52 050 A1 | 5/2003 |
| EP | 0 821 641 B1 | 8/2000 |

(Continued)

OTHER PUBLICATIONS

International Search Report, dated Sep. 23, 2010, from corresponding PCT application.

*Primary Examiner* — James Mackey
(74) *Attorney, Agent, or Firm* — Young & Thompson

(57) ABSTRACT

Disclosed is a molding device for a machine for manufacturing containers, including: two half-molds; two mold carriers, each of which is provided with a recess for receiving a corresponding half-mold; and at least one retractable attachment bolt that is slidably mounted in at least one mold carrier between an operative position, in which the bolt is extended to removably attach the corresponding half-mold in a clampingly mounted position against the back wall of the corresponding recess, and a retracted position, in which the bolt releases the half-mold, characterized in that each bolt and/or the corresponding half-mold include a clamping strip that is angled so as to cause the half-mold to bear against the back wall of the recess during the sliding of the attachment bolt from the retracted position thereof to the operative position thereof.

20 Claims, 12 Drawing Sheets

(56) References Cited

U.S. PATENT DOCUMENTS

| | | | |
|---|---|---|---|
| 8,070,470 B2 * | 12/2011 | Tsau et al. | 425/195 |
| 2003/0082262 A1 | 5/2003 | Effenberger | |
| 2006/0233909 A1 | 10/2006 | Perez et al. | |
| 2007/0212442 A1 * | 9/2007 | Nonogaki | 425/541 |
| 2009/0136613 A1 | 5/2009 | Linke et al. | |

FOREIGN PATENT DOCUMENTS

| | | |
|---|---|---|
| FR | 2 552 366 A1 | 3/1985 |
| FR | 2 646 802 A1 | 11/1990 |
| FR | 2 764 544 A1 | 12/1998 |
| WO | 96/33059 A1 | 10/1996 |
| WO | 2007/012308 A1 | 2/2007 |

* cited by examiner

MOLDING DEVICE PROVIDED WITH A CONTROLLED MEANS FOR CLAMPINGLY ATTACHING A HALF-MOLD BY MEANS OF SLIDABLE ATTACHMENT BOLTS

The present invention concerns a molding device for a machine for producing containers, notably bottles.

The present invention more particularly concerns a molding device for a machine for producing containers, notably bottles, in thermoplastic material by blowing or drawing-blowing a preform, the molding device including:

two half-molds each of which is provided with a half-imprint and each of which includes a front joint face and a rear face;

two mold-carriers each of which is provided with a recess intended to receive an associated half-mold in a mounted position in which the rear face of the half-mold is in contact with the bottom of the recess; and at least one retractable fixing bolt that is slidably mounted in at least one mold-carrier to slide between an active position in which it is extended to fix in demountable manner the associated half-mold in the mounted position clamped against the bottom of the associated recess by at least one locking face of each fixing bolt bearing against an associated fixing face of the half-mold, and a retracted position in which it releases the half-mold.

There are known in the prior art molding devices intended to equip machines for producing containers, notably but not exclusively so-called "rotary machines" including a carousel provided circumferentially with a particular number of identical blowing stations.

Plastic material containers, such as bottles, flasks, etc. are produced therein from preforms or blanks pre-heated in a heat treatment oven. Depending on the number of imprints in the molds, one or more preforms are fed in this way to a station of the machine to be inserted into a molding device with which blowing or drawing-blowing means are associated.

Such molding devices include at least one mold constituted of two half-molds supported by respective mold-carriers that are mounted to be mobile relative to each other.

Each half-mold is generally fixed to an associated mold-carrier in a removable manner by fixing means in order to enable demounting for a change of mold, in particular to proceed to the production of containers of different shapes and/or different sizes or to replace them in the event of damage to and/or wear of the half-molds.

To reduce production costs as much as the time necessary for such demounting of the mold, various improvements to the molding devices are already proposed in the document EP-B1-0 821 641.

According to the teachings of the above document, means for regulating the temperature of the imprints of each half-mold are produced in a part (called the shell-carrier in the above document) separate from the half-mold (called a shell in the above document). The shell-carrier is intended to be fixed permanently to the mold-carrier, whereas the half-mold provided with the half-imprint is adapted to be removably fastened to the shell-carrier by fast fixing means. This configuration enables a light half-mold to be produced that is easily manipulated by a single operator.

The means for fixing the half-mold onto the mold-carrier are disposed on respective edges of the half-mold and the shell-carrier that are parallel to the main axis of the imprint. These fixing means include in particular a locking lug mounted on the mold-carrier in a fixed or mobile manner projecting over the joint face of the half-mold to fix the half-mold firmly to the shell-carrier. The half-mold is clamped against the bottom of the recess by fast screwing of the locking lugs onto a joint face of the mold-carrier.

With the fixing means known in the art, the mounting and demounting operations are carried out by at least one operator and require the use of tools, such as screwdrivers, to demount the fixing bar with the mold-carriers in the open position.

The document WO-A-2007/012308 proposes to clamp the half-mold against the bottom of the recess by means of a set of springs that are interleaved between a drive element and a base element that carries the locking lugs. The movement of the control element enables, over a first part of its travel, driving of the movement of the locking lugs between a retracted position and an active position, and then, over a second part of its travel, clamping of the locking lugs in the active position against the half-mold by way of the springs.

Such fixing and clamping means nevertheless include numerous moving parts. These fixing means are therefore complex and costly to manufacture.

Furthermore, the drive means proposed in the above document necessitate the use and manipulation of a tool by the operator carrying out the mounting operation.

The aim is therefore to reduce further the time necessary for mounting and demounting the half-molds in such a manner as to reduce further the intervention time, by means of fast fixing means that are simple and of relatively low cost to manufacture.

To this end, the invention proposes a molding device of the type described above characterized in that each fixing bolt and/or the associated half-mold includes a clamping ramp that is inclined in such a manner as to press the half-mold against the bottom of the recess on sliding of said fixing bolt from its retracted position to its active position.

According to other features of the invention:

each fixing bolt and/or the associated half-mold includes a clamping ramp that is inclined in such a manner as to press the half-mold against the bottom of the recess on sliding of said fixing bolt from its retracted position to its active position;

the recess has an entry in a transverse plane that is delimited transversely by a vertical first edge and a vertical second edge;

each fixing bolt is mounted to slide transversely between its active position in which said fixing bolt projects through the entry of the recess and its retracted position in which it is completely retracted relative to the entry of the recess;

the sliding of each fixing bolt is driven by driving means integrated into the mold-carrier;

the drive means include at least one vertical transmission shaft that is rotatably mounted in the mold-carrier and said drive means include means for transforming the rotation movement of the transmission shaft into sliding movement of at least one fixing bolt;

the transmission shaft is connected to at least one fixing bolt by a cam mechanism that transforms rotation movement of the transmission shaft into sliding movement of said fixing bolt;

the transmission shaft is connected to said fixing bolt by a cam and frame mechanism;

the transmission shaft includes a pinion that cooperates with a rack of the fixing bolt to drive sliding of the fixing bolt;

the transmission shaft is a cranked shaft that is articulated to the fixing bolt by a link for transforming rotation movement of the transmission shaft into sliding movement of the fixing bolt;

the drive means include at least one handle that is intended to be actuated manually by an operator to drive sliding of each fixing bolt between its two positions;

each handle is formed by an arm that is orthogonal to the transmission shaft and is fixed to one end of the associated transmission shaft;

the molding device includes at least two fixing bolts that are slidably mounted at the border of the first edge of the entry of the recess;

sliding of all the fixing bolts of the first edge is driven by a common first transmission shaft;

the molding device includes at least one lug for locking the half-mold in the mounted position that is carried in fixed manner by the mold-carrier at the border of the opposite second edge of the entry of the recess;

the molding device includes at least two other retractable fixing bolts that are slidably mounted at the border of the opposite second edge of the entry of the recess;

sliding of all the fixing bolts of the second edge is driven by a common second transmission shaft;

at least one fixing bolt is formed by a ball;

the molding device includes a safety device that locks the fixing bolts in their active position.

Other features and advantages will become apparent on reading the following detailed description, to understand which reference should be made to the appended drawings, in which.

In the remainder of the description, elements having similar, analogous or identical functions are designated by the same reference numbers.

Figure 1:
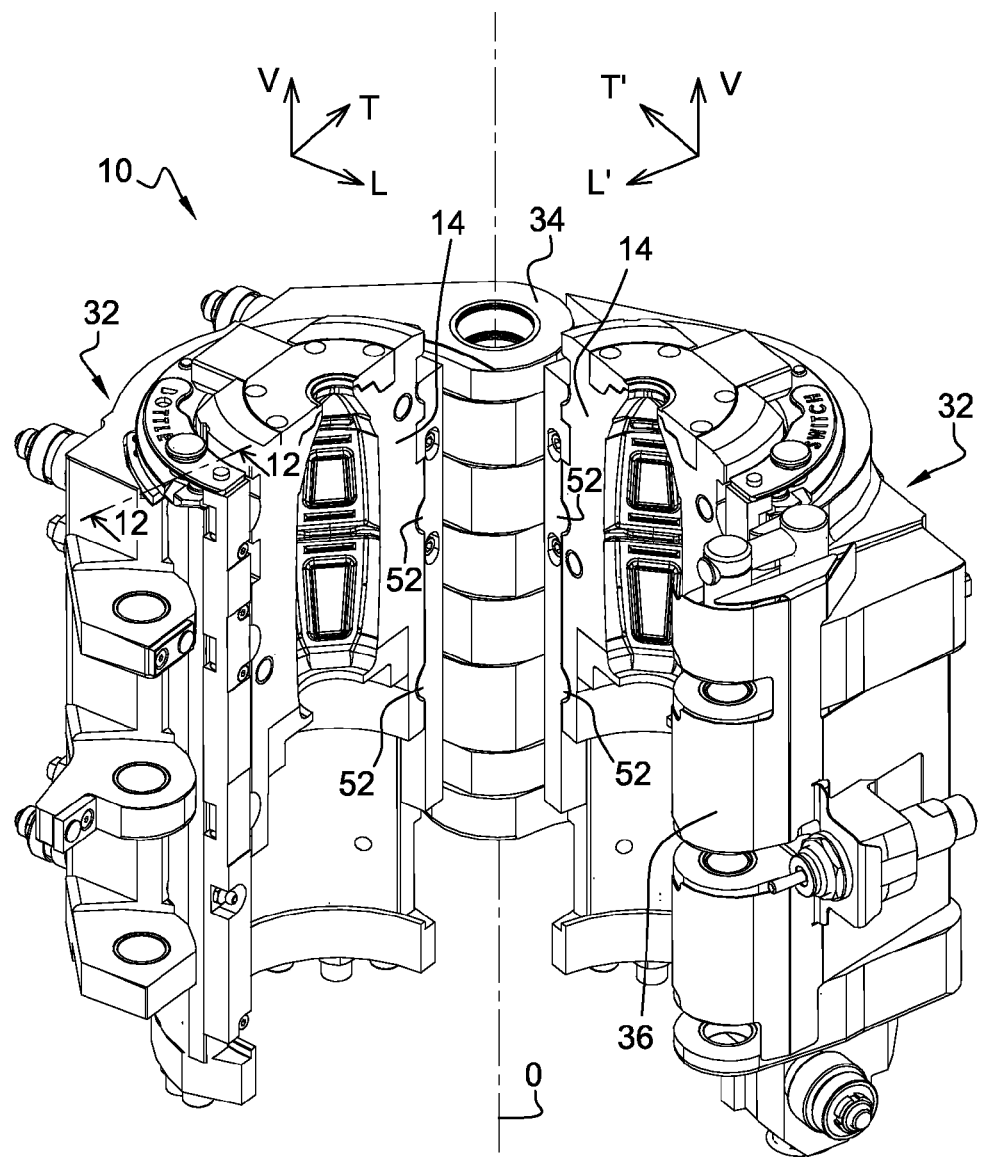
FIG. 1 is a perspective view showing a blowing device produced according to the teachings of the invention and including two mold-carriers provided with their half-mold, the mold-carriers being in the open position.
Figure 2:
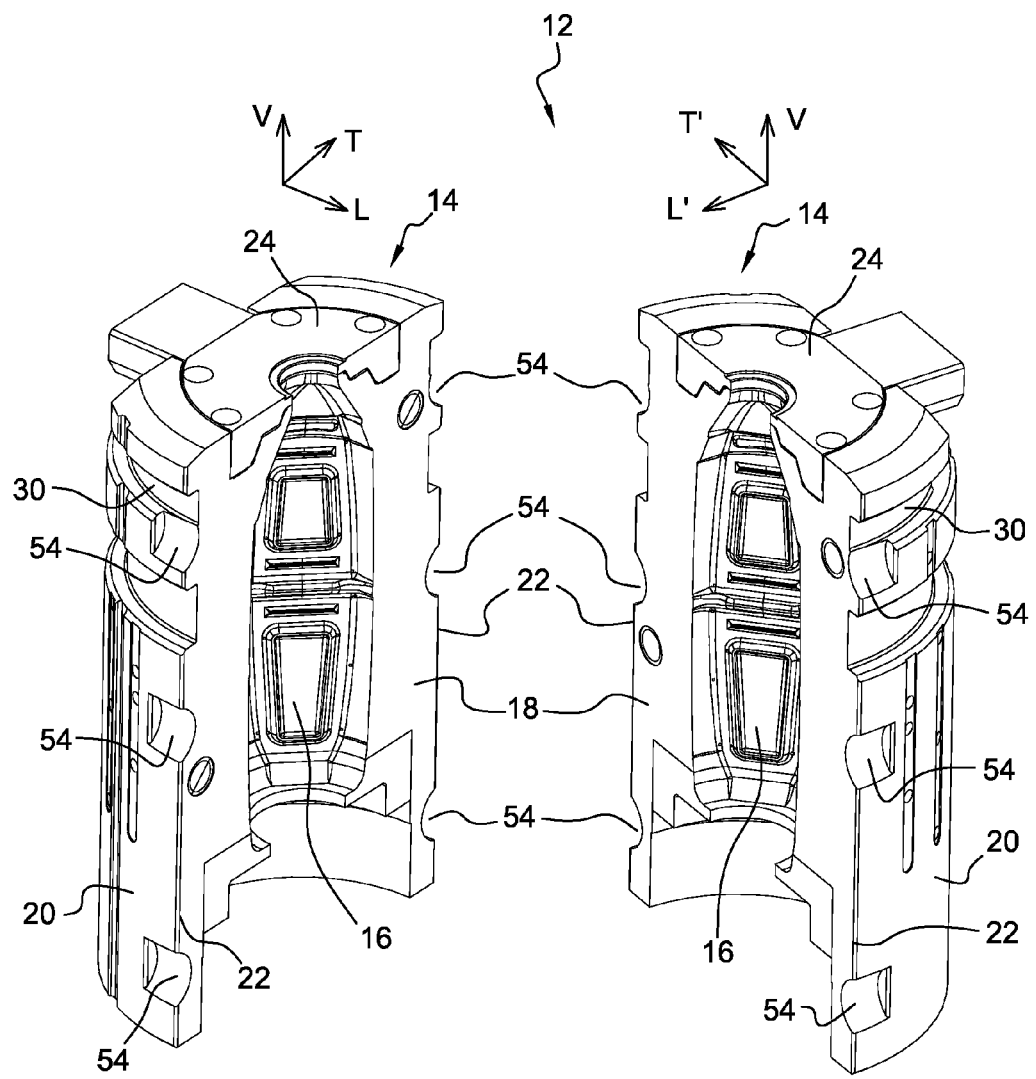
FIG. 2 is a perspective view showing the two half-molds from FIG. 1 in a separated position.

In the remainder of the description, there are adopted without this being limiting on the invention longitudinal, vertical and transverse orientations for each mold-carrier 32 indicated by the orthogonal frame of reference "L,V,T" for the first mold-carrier 32 on the left in FIG. 1 and "L',V,T" for the second mold-carrier on the right in FIG. 2. Thus the transverse directions "T" and "T" and the longitudinal directions "L" and "L" are fixed relative to each mold-carrier 34. For each mold-carrier 32, the longitudinal direction "L", "L" is oriented from the rear toward the front in the direction of the other mold-carrier 32 when the mold-carriers 32 are in the closed position.

The terms "interior", respectively "exterior" are adopted to designate a face or a direction facing toward the interior, respectively exterior of the recess 38 of a mold-carrier.

There is shown in FIG. 1 a molding device 10 for a machine (not shown) for production of thermoplastic material containers, in particular bottles, by blowing or drawing-blowing a pre-heated preform.

The molding device 10 shown in FIG. 1 nevertheless constitutes only one nonlimiting embodiment of the type of molding device 10 to which fixing means produced according to the teachings of the invention may be applied.

The molding device 10 shown in FIG. 1 is more particularly intended to equip a station of a "rotary" type production machine, i.e. one generally including a carousel at the circumference of which are disposed stations each comprising a molding device 10 associated with blowing or drawing-blowing means, also known as blowing nozzles.

Nevertheless, the fixing means of the invention may equally well be used in a production machine of linear (and not rotary) type.

See for example the document FR-A-2-764 544 for more details of blowing or drawing-blowing means.

Figure 3:
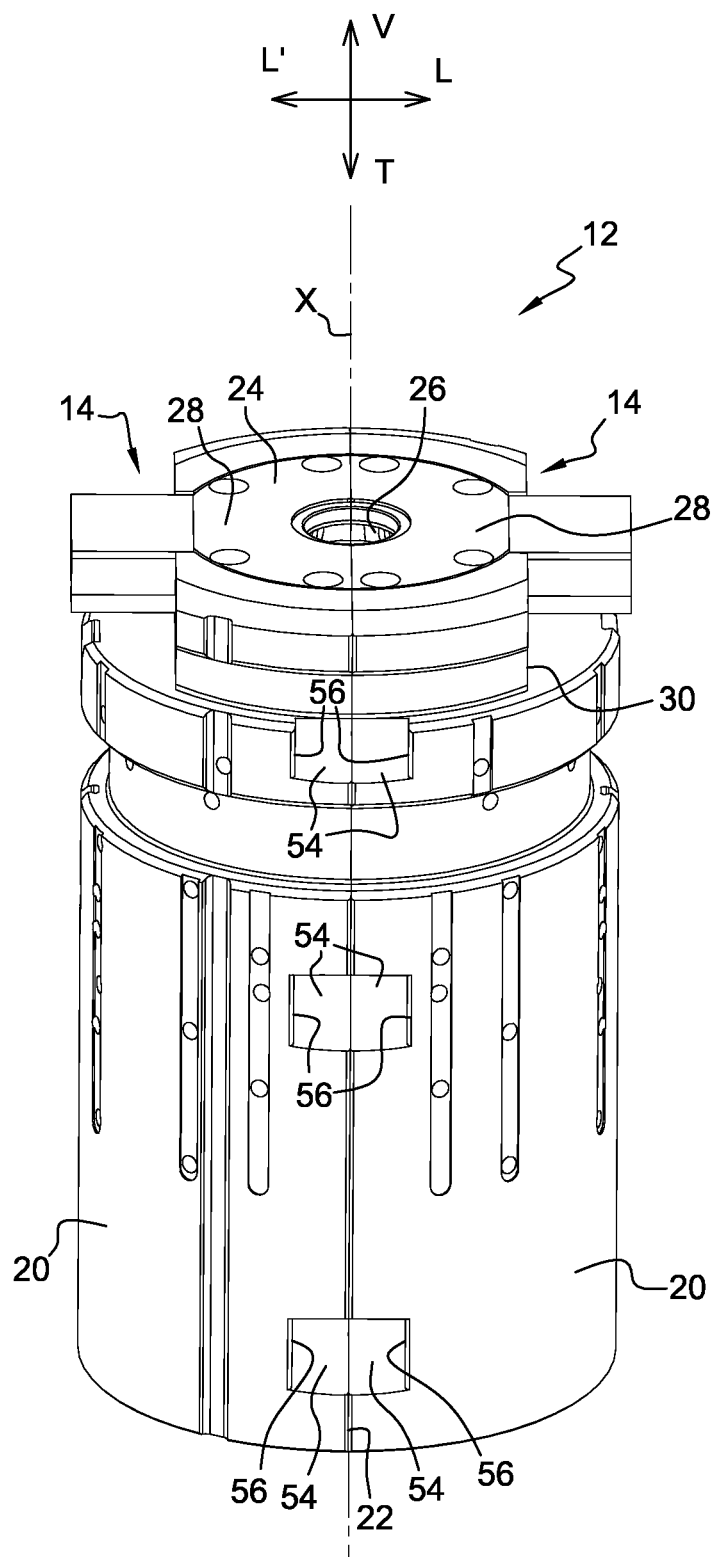
FIG. 3 is a perspective view showing the two half-molds from FIG. 2 in a joined position.

As may be seen in detail in FIGS. 2 and 3, the molding device 10 includes at least one mold 12 constituted of two half-molds 14 that are mirror images or each other with respect to their joint plane. Here the mold 12 has a cylindrical shape divided axially into two parts to form each half-mold 14.

As shown in FIG. 2, each half-mold 14 includes a half-imprint 16 of the final container recessed into a front joint face 18. Here the joint face 18 is a plane vertical transverse face that is formed by the section face of the cylinder forming the mold 12.

The half-molds 14 are adapted to occupy a separated position, as shown in FIG. 2, in which the two half-molds 14 are spaced from each other, and a joined position, as shown in FIG. 3, in which the two half-molds 14 are joined together at their joint face 18 to form the mold 12.

Each half-mold 14 further includes a rear face 20 opposite the joint face 18 and having the overall shape of a circular half-cylinder substantially coaxial with the vertical main axis "X" of the imprint 16 of the container.

Each half-mold 14 has two vertically oriented rectilinear edges 22 at the junction between its joint face 18 and its rear face 20.

In the joined position, the mold 12 has a circular horizontal upper face 24 with a central opening 26 adapted to enable entry of the blowing air, or even of a drawing rod.

The upper face 24 of each half-mold 14 is preferably formed by two separate plates 28 each of which is firmly attached to a half-mold 14. The lower end of a nozzle (not shown) comprising the blowing or drawing-blowing means is adapted to come into contact with the upper face 24 formed by the two plates 28.

The half-molds 14 further include in their upper part, just below the horizontal upper face, an annular groove 30 that extends circumferentially and continuously around the two half-molds 14 when they are joined.

If the container to be produced has a bottom of complex shape, in particular a petal shape, problems are likely to arise with removal from the mold.

It is for this reason that there is then advantageously provided a separate mold bottom (not shown), separate from the half-molds 14, said mold bottom including an imprint of the bottom of the container complementary to the half-imprints 16.

Each half-mold 14 is intended to be demountably fixed to an associated mold-carrier 32 of the molding device 10. Such mold-carriers 32 are shown in more detail in FIGS. 1 and 4.

Figure 4:
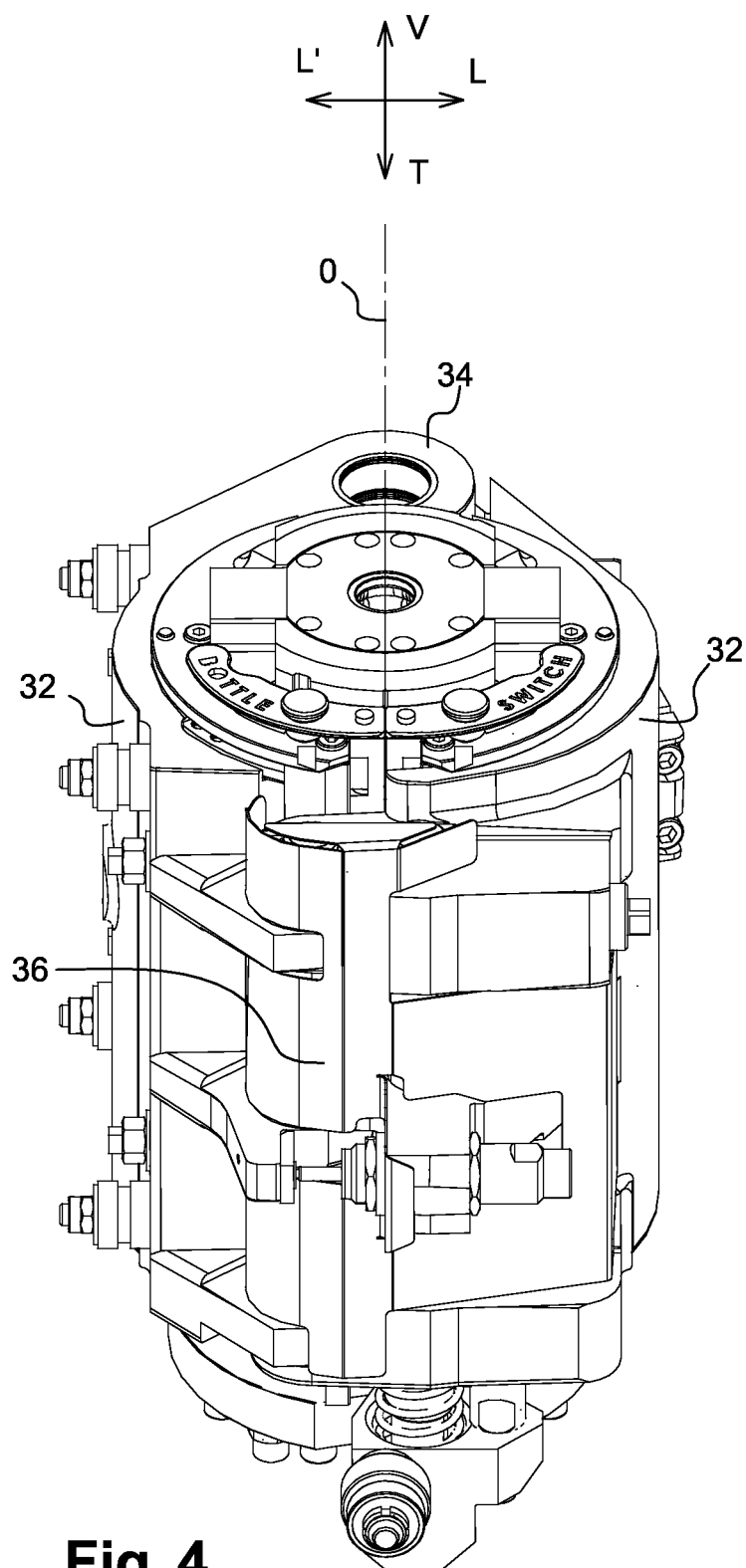
FIG. 4 is a view similar to that of FIG. 1 showing the two mold-carriers in a closed position.

The two mold-carriers 32 are mounted to be mobile relative to each other between a closed position, as shown in FIG. 4, in which the two half-molds 14 are joined to form the imprint 16, and an open position, as shown in FIG. 1, in which the two half-molds 14 are separated, for example to enable extraction of a container after blowing.

In the example shown in FIGS. 1 and 4, the mold-carriers 32 are constituted in the form of two carrier structures articulated about a common hinge 34 with a vertical pivot axis "O". The hinge 34 is generally carried by a bracket (not shown) that is fixed relative to the carousel.

The mold-carriers 32 are then able to move apart from each other by pivoting about the axis "O" and are consequently mounted to pivot between their open position (FIG. 1) and their closed position (FIG. 4).

As shown in FIG. 1, when the mold-carriers 32 are opened from their closed position, they begin to move away from each other in a rearwardly oriented longitudinal opening direction that is orthogonal to the joint face 18 of the half-molds 14.

Because of the kinematics of the mold-carriers 32, such a molding device 10 is referred to as a "book-like opening" mold.

In a variant of the invention that is not shown, the molding device includes two mold-carriers mounted to be mobile in translation relative to each other in a longitudinal direction between an open position and a closed position.

The molding device 10 further includes a lock 36 that is transversely disposed diametrically opposite the hinge 34 relative to the vertical axis "X" of the imprint 16, as shown in FIG. 4.

This kind of lock 36 is also known in the art and is therefore not described in more detail here. This lock 36 has the notable function of preventing any inopportune opening during blowing, where the pressures may reach 40 bars, depending on the application.

For fuller details on the structure and operation of such a lock 36, see for example the document FR-A-2 646 802, which includes a general description of a similar lock.

The mold-carriers 32 and the half-molds 14 being substantially mirror images of each other with respect to the joint plane of the mold-carrier 32, there is described hereinafter only the mold 12 situated on the left in FIG. 1, the description being applicable to the other by reason of their symmetry.

Figure 5:
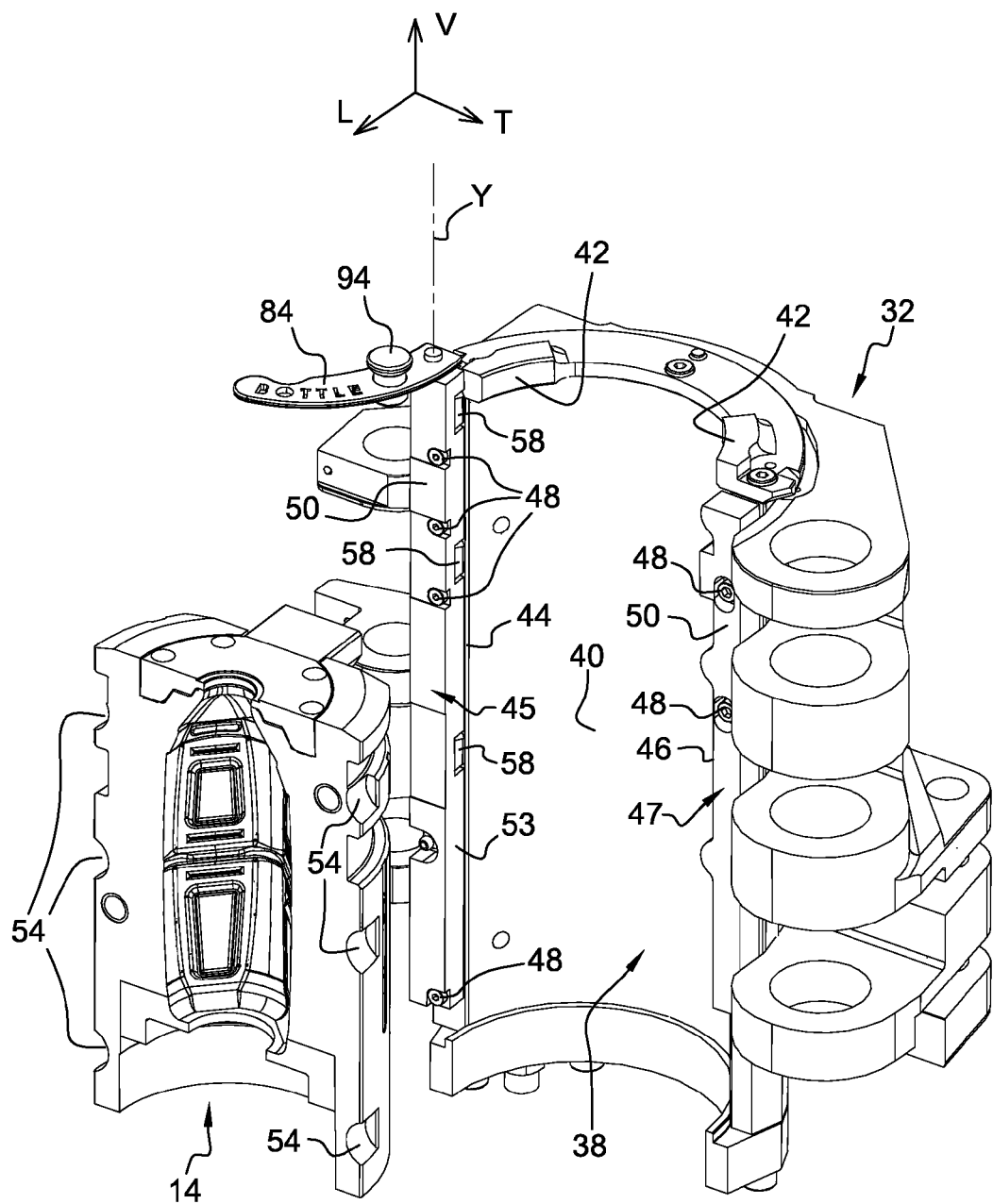
FIG. 5 is a perspective view showing a mold-carrier including a controlled fixing device in its retracted position and a half-mold in a demounted position.

As shown in FIG. 5, the half-mold 14 is more particularly adapted to be received in a recess 38 of the associated mold-carrier 32 to occupy a mounted position.

The molding device 10 includes fixing means that are adapted to fix each half-mold 14 demountably in the mounted position in the recess 38 of the associated mold-carrier 32. These means are described in more detail hereinafter.

The recess 38 is delimited longitudinally toward the rear by a concave bottom 40 of semi-cylindrical shape complementary to the rear face 20 of the half-mold 14.

Moreover, the recess 38 is delimited in the vertically upward direction by the lower face of a rim 42 that extends radially inward, projecting relative to the bottom 40 of the recess 38. The groove 30 in the half-mold 14 is adapted to be nested longitudinally with this rim 42 to enable vertical positioning and retention of the half-mold 14 relative to the mold-carrier 32.

The entry of the recess 38 is furthermore delimited transversely on the one hand by a first vertical edge 44 and on the other hand by a second vertical edge 46. The edge 46 situated in the vicinity of the hinge 34 is referred to as the proximal edge and the edge 44 farther away from the hinge 34 is referred to as the distal edge.

Each of the distal and proximal edges 44, 46, respectively, of the recess 38 is bordered by a distal vertical border bar 45, a proximal vertical border bar 47, respectively, that is fixedly attached to the structure of the mold-carrier 32 by rigid fixing means such as screws 48. Each border bar 45, 47 has a rectangular or square contour horizontal section.

Figure 10:
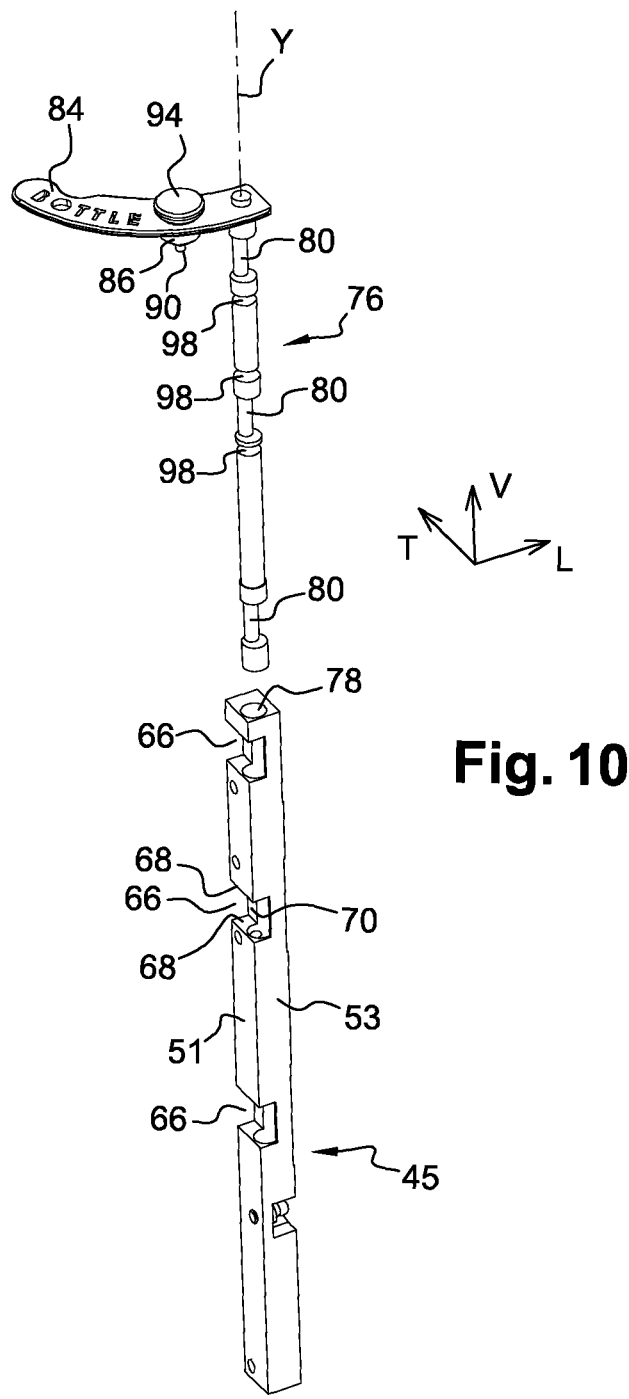
FIG. 10 is an exploded perspective view showing a transmission shaft of the drive means of the fixing device and a border bar of the mold-carrier in which it is to be mounted.

Each border bar 45, 47 is in particular delimited longitudinally by a vertical transverse front mating face 50, visible in FIG. 5, and by a vertical transverse rear contact face 51, visible in FIG. 10, by which it is fixed to the mold-carrier 32. Each border bar 45, 47 is also delimited transversely by two lateral faces 53 respectively interior and exterior relative to the recess 38.

The mating face 50 of each border bar 45, 47 is intended to come into plane contact with the mating face 50 of a facing border bar 45, 47 of the other mold-carrier 32 when the mold-carriers 32 in their closed position. In the mounted position of the half-mold 14, its joint face 18 is substantially coplanar with the mating faces 50 of the border bars 45, 47 that border the recess 38, as is particularly visible in FIG. 1.

Moreover, the mold-carrier 32 is provided with means (not shown) for regulating the temperature of the imprint 16 that are formed by conduits formed in the thickness of the bottom 40 of the recess 38 and in which a heat-exchange fluid circulates.

After fixing the half-mold 14 in its mounted position in the mold-carrier 32, the rear face 20 of the half-mold 14 and the bottom 40 of the recess 38 of the mold-carrier 32 are in clamped contact, pressed against each other. Accordingly, the transmission of heat between the half-mold 14 and the mold-carrier 32 is obtained by conduction between the rear face 20 of the half-mold 14 and the bottom 40 of the recess 38.

The molding device 10 includes fixing means adapted to fix each half-mold 14 occupying a mounted position in a demountable manner to the mold-carrier 32. These fixing means are also adapted to clamp the half-mold 14 against the bottom 40 of the associated recess 38 of the mold-carrier 32 to press the rear face 20 of the half-mold 14 against the bottom 40 of the recess 38. Thus there remains no air film liable to insulate the half-mold 14 thermally from the mold-carrier 32.

The fixing means for only one module-carrier 32 are described hereinafter, the fixing means for the other mold-carrier 32 being identical.

The fixing means are at least in part controllable. In the example shown in FIGS. 6 and 8, the controllable fixing means are disposed only at the border of the distal edge 44 of the recess 38, the other, proximal edge 46 being equipped with passive fixing means.

Figure 6:
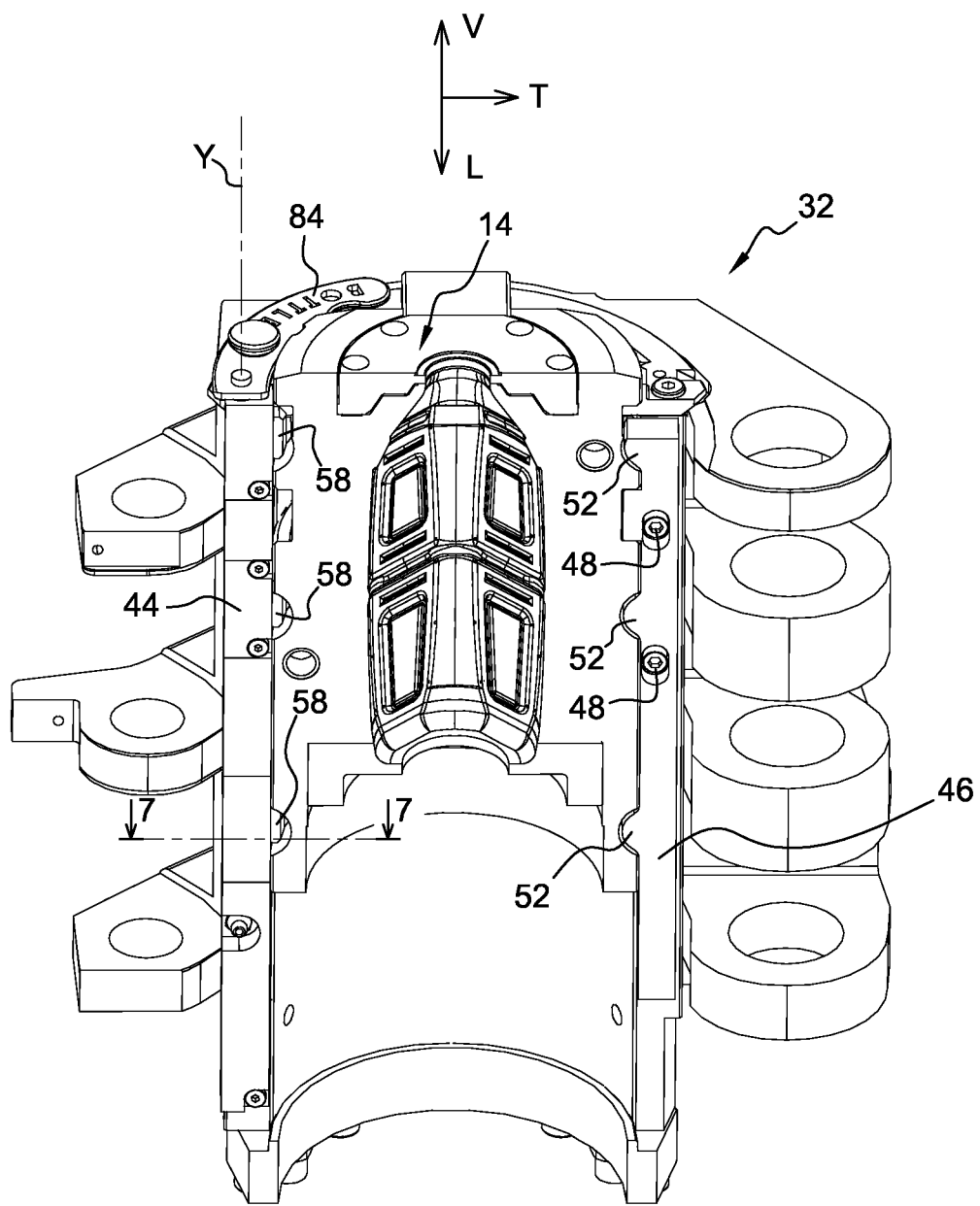
FIG. 6 is a front view showing the mold-carrier from FIG. 5 and in which the half-mold is mounted and fixed.
Figure 8:
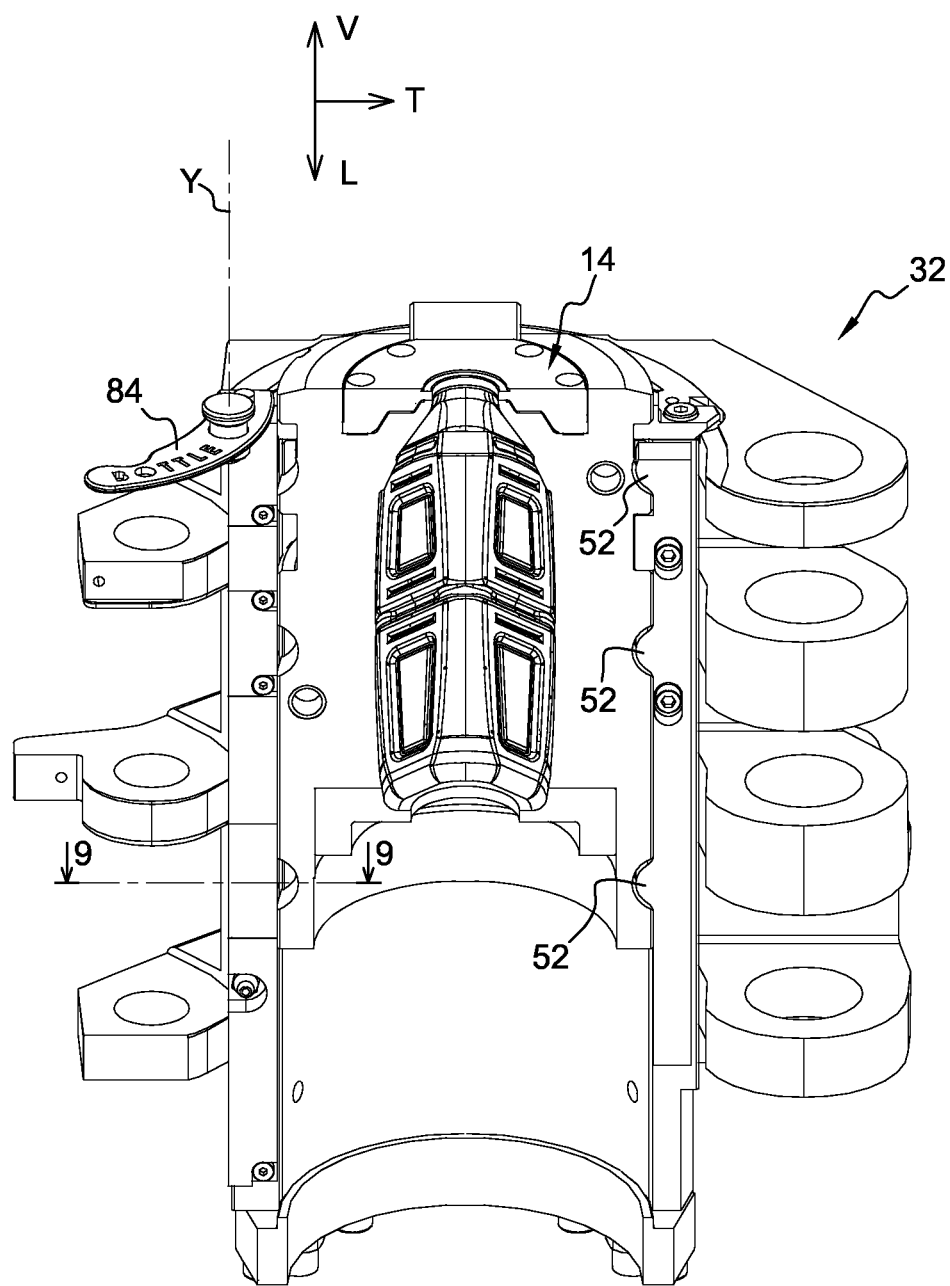
FIG. 8 is a view similar to that of FIG. 6 showing the half-mold mounted in but not fixed to the mold-carrier, the fixing device being retracted.

In the example shown in FIGS. 6 and 8, the passive fixing means include at least one lug 52 for locking the half-mold 14 in the mounted position that is carried in fixed manner by the mold-carrier 32 at the border of the proximal edge 46.

Here there are three locking lugs 52 distributed along the proximal edge 46 of the recess 38. They project transversely inward relative to the proximal edge 46 of the bottom 40 of the recess 38.

Moreover, as seen clearly in FIG. 1, the locking lugs 52 are flush with or longitudinally set back rearwardly relative to the joint face 18 of the half-mold 14 in the mounted position in order to prevent any interference on closing the mold 12.

Each locking lug 52 is intended to be received in a rebate 54 produced in the corresponding edge 22 of the half-mold 14. The locking lugs 52 are more particularly intended to be pressed longitudinally against a transverse vertical front fixing face 56 of the half-mold 14 in the bottom of the rebate 54.

In known manner, the locking lugs 52 are all carried by the common proximal border bar 47, sometimes referred to as the "black bar". The proximal border bar 47 is permanently fixed to the mold-carrier 32, for example by means of screws 48. These locking lugs 52 are thus intended to remain in place during operations of changing the half-mold 14.

Figure 7:
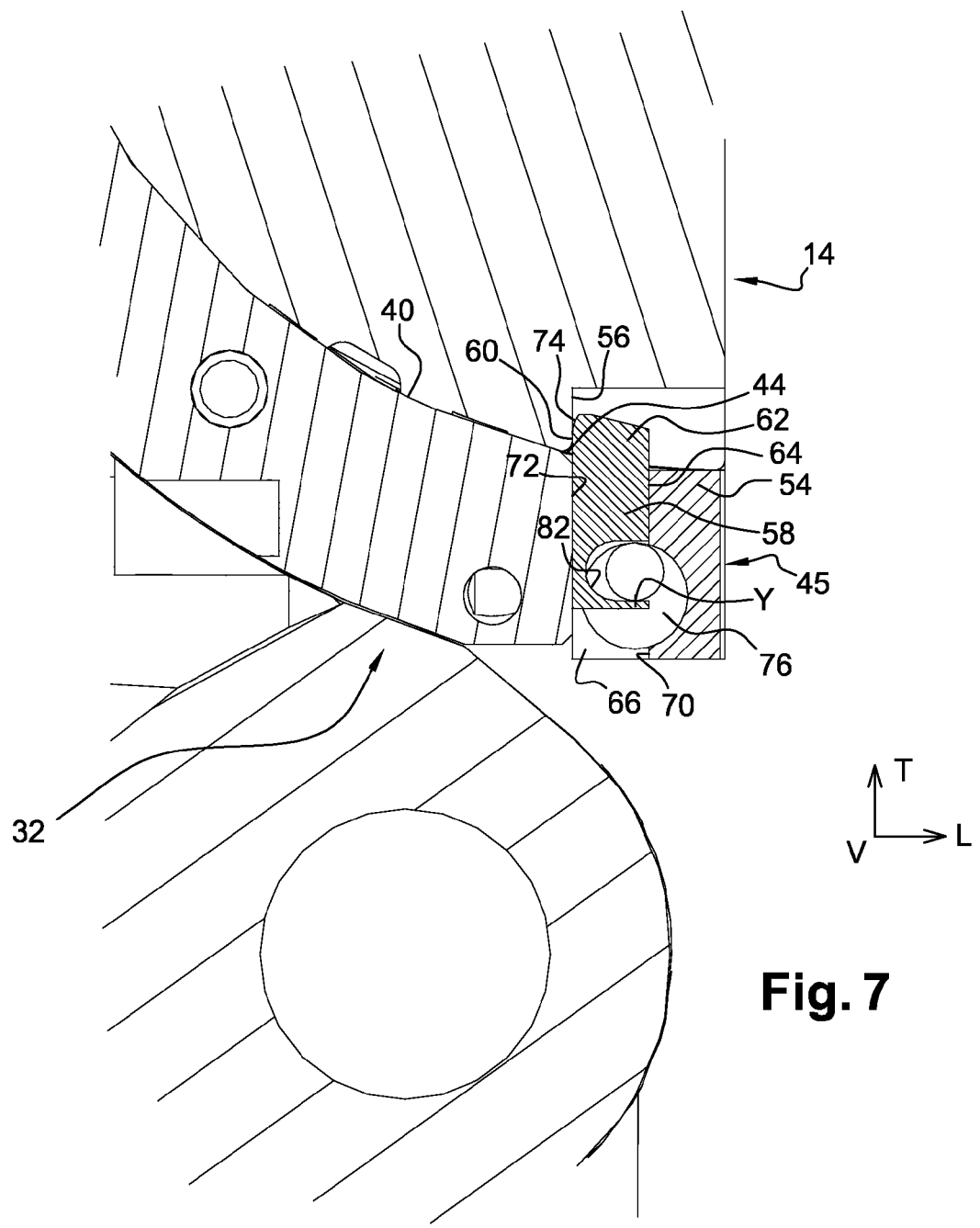
FIG. 7 is a view in section taken along the line 7-7 in FIG. 6 showing a fixing bolt in its active position.

The controllable fixing means include at least one fixing bolt 58 that is mounted in the mold-carrier 32 to be mobile between:

an active position, as shown in FIGS. 6 and 7, in which it is extended to fix in demountable manner the half-mold 14 in its mounted position and clamped against the bottom 40 of the associated recess 38 by at least one locking face 60 of each fixing bolt 58 bearing against an associated fixing face 56 of the half-mold 14; and a retracted position in which the fixing bolt 58 frees the entry of the recess 38 to enable the half-mold 14 to pass.

As for the locking lugs 52, in its active position, each fixing bolt 58 is set back longitudinally toward the rear relative to, or at least flush with, the joint face 18 of the half-mold 14.

Moreover, each fixing bolt 58 is advantageously mounted to be mobile in such a manner as not to project longitudinally toward the front beyond the joint face 18 of the half-mold 14 at any point on its trajectory between its two positions. This enables driven movement of the fixing bolt 58 even when the mold-carriers 32 are in their closed position.

A free interior transverse end section 62 of each fixing bolt 58 is intended to be received in an associated rebate 54 produced in the corresponding edge 22 of the half-mold 14 when the half-mold 14 is in its mounted position. The vertical transverse bottom of each rebate 54 forms a fixing face 56 of the half-mold 14.

Alternatively, the rebate is replaced by a mortise produced in the half-mold.

The mold-carrier 32 includes at least two fixing bolts 58 at the border of the distal edge 44 of the entry of the recess 38. Here there are three fixing bolts 58 distributed along the distal edge 44 of the entry of the recess 38.

All the fixing bolts 58 look identical in the embodiment shown in the figures. Therefore only one fixing bolt 58 is described hereinafter.

Figure 9:
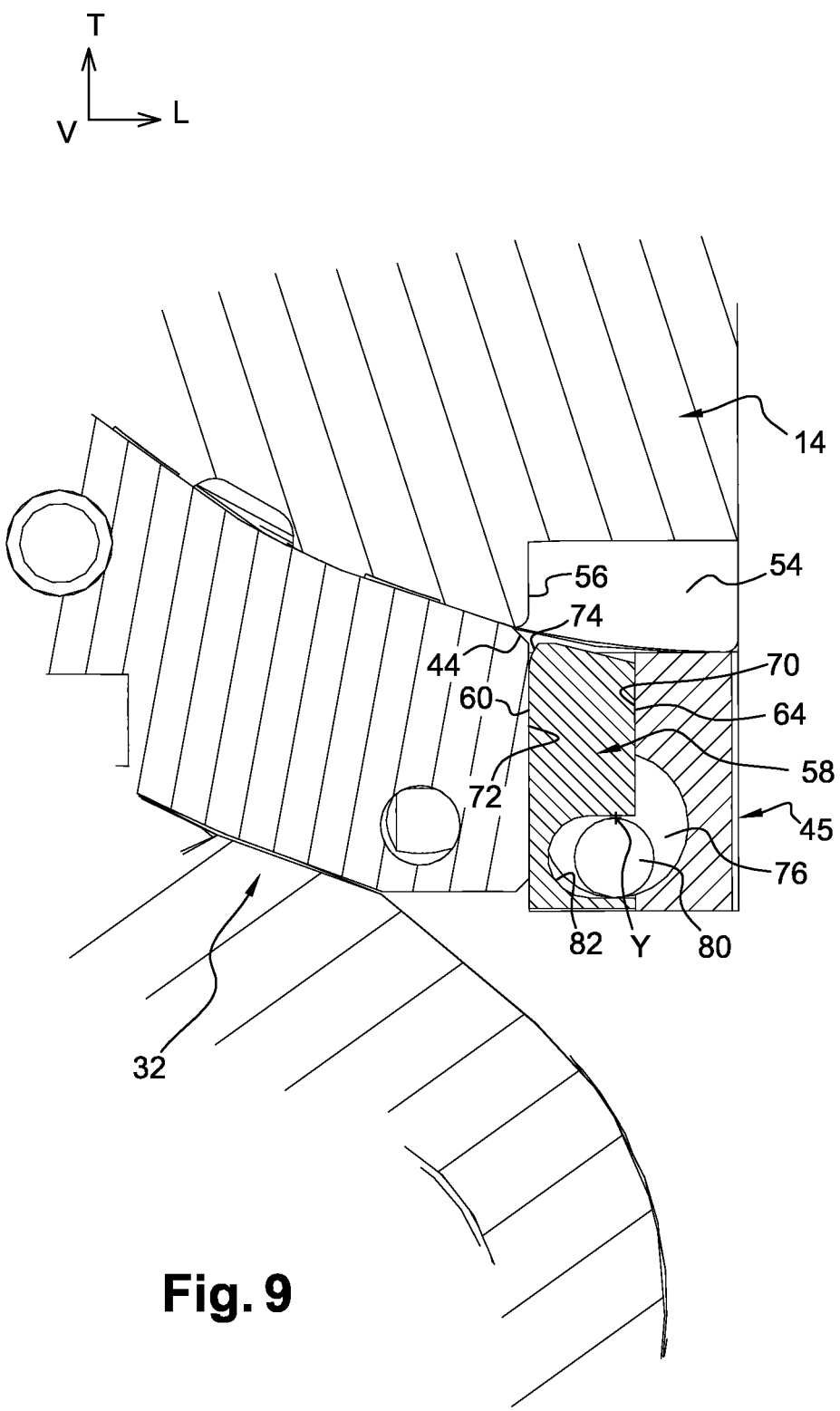
FIG. 9 is a view in section taken along the line 9-9 in FIG. 8 showing the fixing bolt in its retracted position.

Referring to FIGS. 7 and 9, the fixing bolt 58 has a globally parallelepipedal shape here. It is delimited longitudinally by a plane rear vertical face forming the locking face 60 and by a plane front vertical face 64.

As shown in FIGS. 7, 9 and 10, each fixing bolt 58 is more particularly mounted to slide transversely in an associated bolt passage 66 produced in the first distal border bar 45 that opens transversely at least in the direction of the interior of the recess 38.

In the embodiment shown in FIG. 10, each bolt passage 66 is delimited vertically by two horizontal guide faces 68 and longitudinally toward the front by a front guide face 70. To facilitate mounting the fixing bolts 58, as explained hereinafter, the bolt passage 66 opens into the rear contact face 51 of the distal border bar 45.

Accordingly, as shown in FIGS. 7 and 9, the fixing bolt 58 is also guided as it slides transversely by a vertical rear face 72 of the mold-carrier 32 in the vertical transverse plane of the entry of the recess 38. Thus each fixing bolt 58 slides on the border of the distal edge 44 of the entry of the recess 38.

In its active position (FIG. 7), the fixing bolt 58 projects transversely relative to the associated distal edge 44 of the entry of the recess 38. In its retracted position (FIG. 9) the fixing bolt 58 is totally retracted relative to said distal edge 44 of the entry of the recess 38.

When the half-mold 14 has been mounted in but not yet fixed to the recess 38, each fixing face 56 of the half-mold 14 on the distal side is slightly longitudinally forward of the locking face 60 of the fixing bolt 58.

As may be seen particularly in FIGS. 7 and 9, each fixing bolt 58 includes a clamping ramp 74 that is inclined in such a manner as to press the associated fixing face 56 in the direction of the bottom 40 of the recess 38 when said fixing bolt 58 slides from its retracted position to its active position. Accordingly, each distal side fixing face 56 of the half-mold 14 is then slightly set back longitudinally toward the rear in such a manner as to be pressed against the locking face 60 of the fixing bolt 58.

The clamping ramp 74 is formed by a bevel formed in the interior transverse vertical edge at the edge of the locking face 60. Here the clamping ramp 74 has a rounded appearance.

Alternatively, the clamping ramp is carried by the half-mold.

In another variant of the invention, not shown, the bolt and the half-mold are both equipped with an associated clamping ramp. The two ramps then cooperate by sliding on each other to clamp the half-mold to the bottom of the recess.

Moreover, the sliding of each fixing bolt 58 is driven by drive means that are integrated into the mold-carrier 32.

As shown in FIG. 10, the drive means include a vertical transmission shaft 76 that is rotatably mounted in the mold-carrier 32. Here the transmission shaft 76 is received in a vertical hole 78 produced in the upper end of the distal border bar 45. The vertical hole thus forms a bearing 78 to enable the transmission shaft 76 to turn about a vertical rotation axis "Y".

Sliding of all the fixing bolts 58 of the distal edge 44 is driven by the common transmission shaft 76. To this end, the bearing 78 crosses the three bolt passages 66 and opens onto the horizontal guide faces 68 on either side of the front guide face 70.

The transmission shaft 76 is connected to each fixing bolt 58 by a cam mechanism that transforms rotation movement of the transmission shaft 76 into sliding movement of the fixing bolts 58. To be more precise, the transmission shaft 76 is here connected to each fixing bolt 58 by a so-called "cam and frame" mechanism.

Thus the transmission shaft 76 includes three cams 80 that are formed by three circular cylindrical sections with a vertical axis that are arranged eccentrically relative to the rotation axis "Y" of the transmission shaft 76. These cams 80 are therefore referred to hereinafter as "eccentric sections 80".

Figure 11:
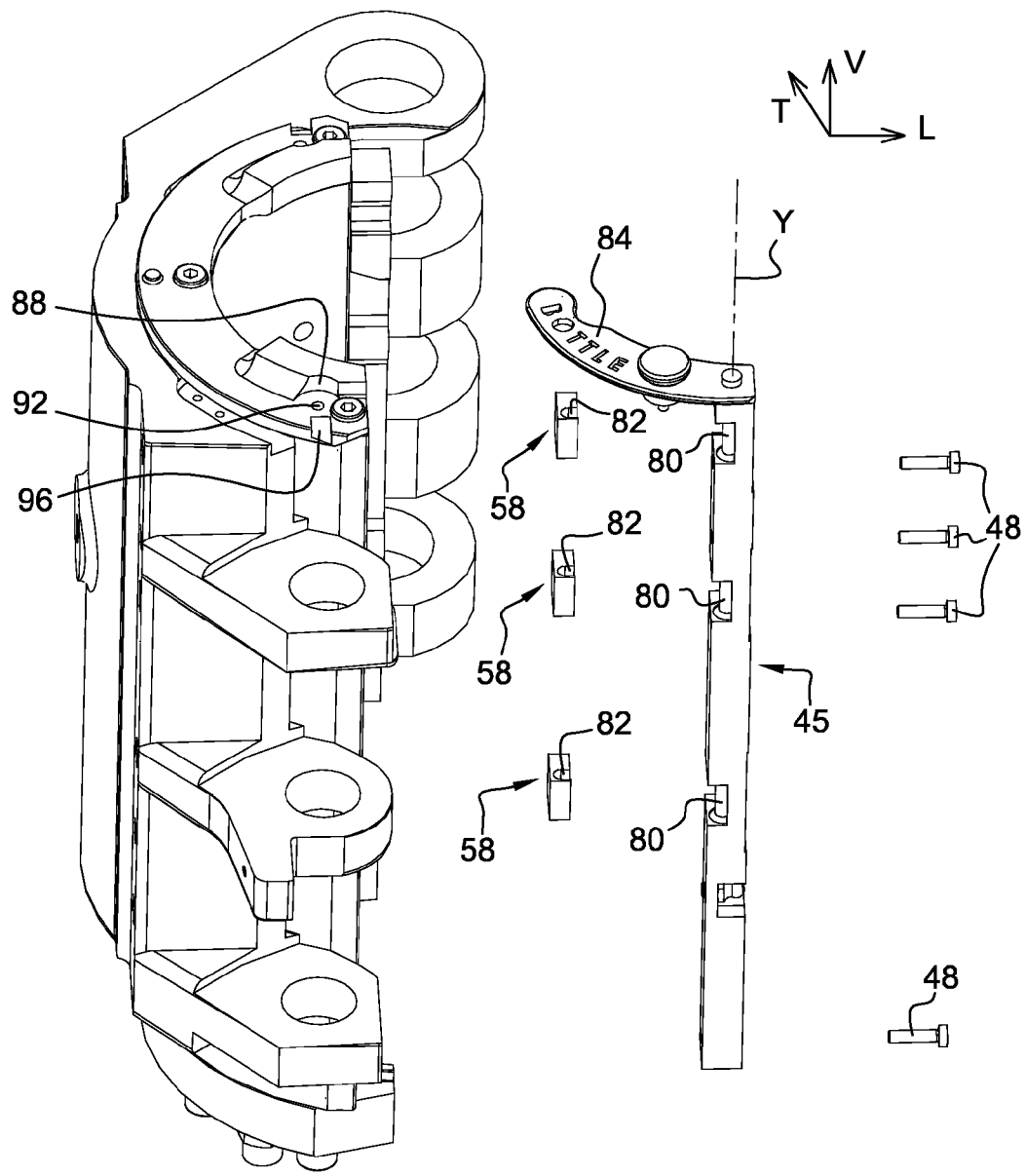
FIG. 11 is an exploded perspective view that shows the shaft mounted in the border bar, the bolts to be slidably mounted in the border bar and the screws fixing the border bar to the mold-carrier.

The eccentric sections 80 are arranged to coincide with the bolt passages 66 when the transmission shaft 76 is mounted by inserting it into its bearing 78, as shown in FIG. 11.

As shown in FIGS. 7 and 9, each eccentric section 80 here has a diameter that coincides in size and in position with a radius of the transmission shaft 76.

Each fixing bolt 58 has in its front face 64 a vertical groove 82 opening vertically at each end that is intended to receive a corresponding eccentric section 80 of the transmission shaft 76. This is shown in more detail in FIGS. 7 and 9, for example.

The groove 82 more specifically has a transverse width substantially equal to the diameter of the eccentric section 80 and a longitudinal depth that allows longitudinal sliding of the eccentric section 80 in the groove 82 during rotation of the transmission shaft 76 through at least one half-turn.

The transmission shaft 76 is thus connected to each fixing bolt 58 by a cam and frame mechanism that transforms rotation movement of the transmission shaft 76 into transverse sliding movement of the fixing bolts 58. Rotation of the transmission shaft 76 also drives retraction and deployment of the fixing bolt 58 between its two positions.

In a variant of the invention that is not shown, the means for transforming rotation movement of the shaft into sliding movement of the fixing bolt are formed by a pinion carried by the shaft that cooperates with a rack constrained to slide with the fixing bolt to drive the sliding of the fixing bolt.

In another variant of the invention that is not shown, the transmission shaft is a cranked shaft that is articulated to the fixing bolt via a link to transform rotation movement of the shaft into sliding movement of the fixing bolt.

According to a further variant of the invention that is not shown, the shaft carries a cam that actively drives sliding movement of the bolt towards one position, the bolt being spring-loaded toward its other position.

Moreover, the drive means are intended here to be operated manually by an operator without using an individual tool. To this end, as shown in FIGS. 6 and 8, for example, the drive means include at least one handle 84 that is intended to be operated manually by an operator to drive sliding of each fixing bolt 58 between its two positions.

Here the handle 84 is formed by an arm that extends orthogonally to the transmission shaft 76 and is fixed to the upper end of the transmission shaft 76 so that it is constrained to rotate about the vertical rotation axis "Y" with the transmission shaft 76. To this end, the upper end of the transmission shaft 76 projects from the vertical hole 78 in the distal border bar 45.

The arm forming the handle 84 is above an upper face of the mold-carrier 32.

The arm forming the handle 84 is sufficiently long to enable the operator to apply by hand a torque necessary for clamping the half-mold 14 to the bottom 40 of the recess 38. The torque is also sufficient to overcome the friction of the locking face 60 of each fixing bolt 58 against the associated fixing face 56 of the half-mold 14 when the fixing bolts 58 are retracted to demount the half-mold 14.

Figure 12:
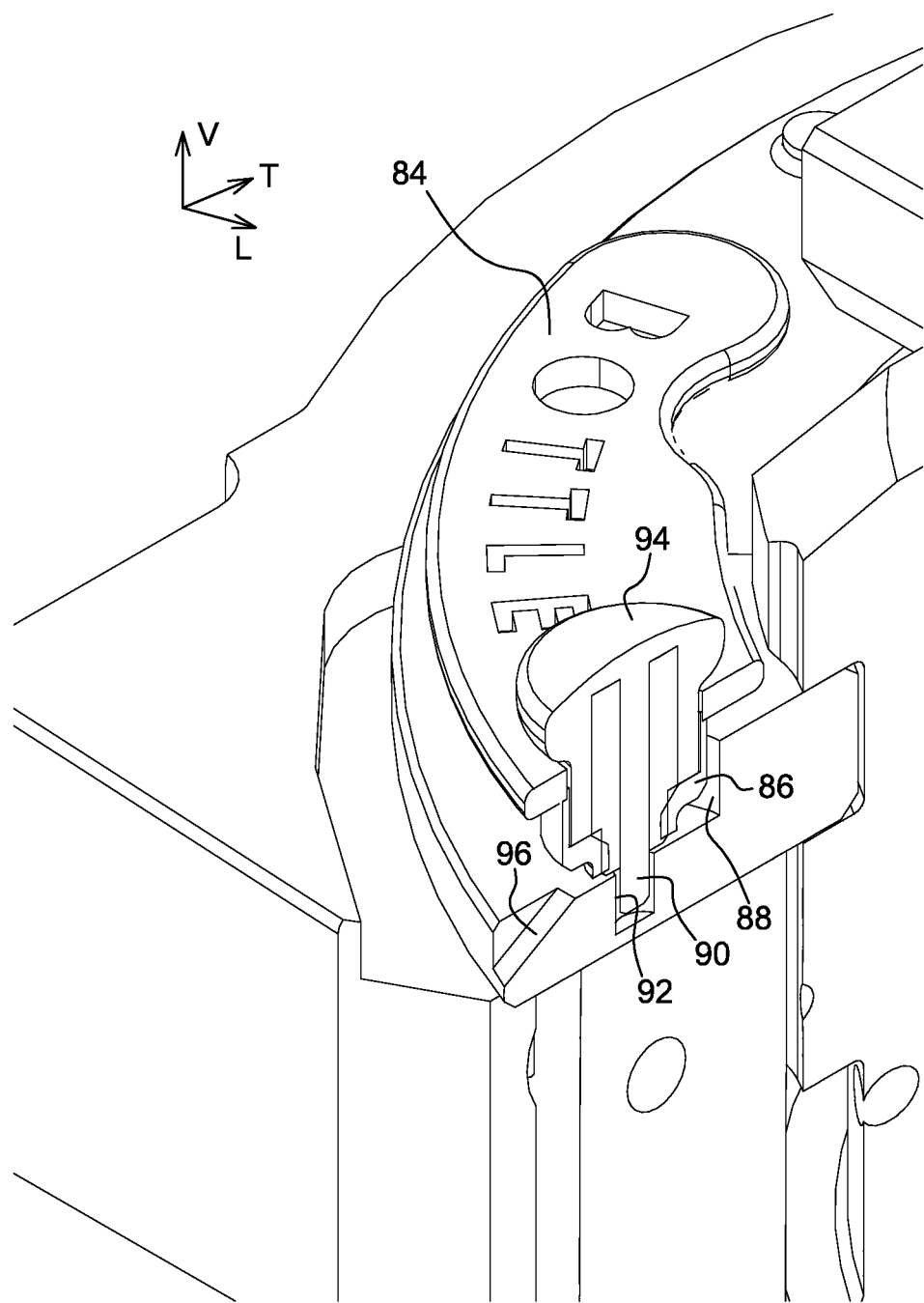
FIG. 12 is a view in section taken along the line 12-12 in FIG. 1 showing a safety device that locks the bolts in the active position.

Furthermore, as shown in FIG. 12, an indexing finger 86 extends vertically downward under the arm forming the handle 84. The indexing finger 86 is adapted to abut against a vertical shoulder face 88 of the mold-carrier 32 when the fixing bolts 58 are in their active position. The operator who operates the locking device is thus informed by the contact of the indexing finger 86 with the shoulder face 88 that the fixing bolts 58 are in their active position.

Thus in the active position of the bolts the arm forming the handle 84 is pushed above the mold-carrier 32 in such a manner as to be accessible even when the mold-carriers 32 are in their closed position. As shown in FIG. 6, in this position the arm forming the handle 84 does not project radially outwards relative to the exterior contour of the mold-carrier 32.

Alternatively, and referring to FIG. 4, the end of the arm that is fixed to the transmission shaft is conformed in such a manner that that the shaft may be turned toward the retracted position of the fixing bolts even in the closed position of the mold-carrier. Said end of the arm is of semicircular shape, for example, which enables the transmission shaft to turn without interfering with the arm of the other mold-carrier.

To prevent the drive means being triggered inopportunely when the half-mold 14 is fixed to the mold-carrier 32, it includes a safety device for locking the fixing bolts 58 in their active position.

Here the locking device is formed by a vertical axis peg 90 that is mounted on the arm forming the handle 84 of the transmission shaft 76. The peg 90 is more particularly mounted to slide vertically in the indexing finger 86 between a low position in which it may be inserted into a complementary locking orifice 92 of the mold-carrier 32 when the fixing bolts 58 are in their active position and a high position in which the peg 90 is completely extracted from the locking orifice 92.

Moreover, the upper end of the peg 90 is connected to a button 94 that enables the operator to pull the peg 90 toward its high position to enable the transmission shaft 76 to be turned in such a manner as to drive the fixing bolts 58 toward their retracted position.

The peg 90 is advantageously spring-loaded into its low position in order to automate the safety device, for example by a spring (not shown) that is placed around the peg 90, in a cylindrical internal chamber of the finger 86. The spring bears on the one hand on a lower internal wall of the finger and on the other hand on a lower wall of the button 94.

The mold-carrier 32 further includes an inclined plane 96 that is disposed on the trajectory of the peg 90 on rotation of the transmission shaft 76 toward the active position of the fixing bolts 58. This inclined plane 96 enables the peg 90 to be driven automatically toward its high position on rotation of the transmission shaft 76 toward the active position of the fixing bolts 58. Accordingly, the lower free end of the peg 90 is able to slide automatically along the inclined plane 96 and then a horizontal plane as far as the locking orifice 92 in which it is spring-loaded into its low position.

As shown in FIG. 10, on mounting the controllable fixing means on the mold-carrier 32, the distal border bar 45 is demounted from the mold-carrier 32. The transmission shaft 76 is first inserted vertically into the bearing 78 of the distal border bar 45 until the arm forming the handle 84 comes into abutment.

The fixing bolts 58 are then inserted longitudinally into the bolt passages 66 opening onto the rear contact face 51, before the distal border bar 45 is fixed to the mold-carrier 32 by the fixing screws 48. This operation is shown in FIG. 11. The fixing bolts 58 are therefore trapped in their bolt passage 66 by interengagement with the eccentric sections 80.

The shanks of said screws 48 also cooperate with annular grooves 98 of the transmission shaft 76, visible in FIG. 10, to retain the transmission shaft 76 vertically in position in the distal border bar 45.

During an operation to change the mold 12, the operator proceeds first to demount a first mold 12.

The operator first moves the mold-carriers 32 equipped with a first mold 12 apart into their open position.

The operator then grasps the arm forming the handle 84 of the controllable fixing device by pulling on the peg 90 so as to be able to turn the transmission shaft 76 in a first anticlockwise unlocking direction.

The fixing bolt 58 being in its active position, as shown in FIG. 7, the anticlockwise rotation of the transmission shaft 76 presses the eccentric section 80 against the external wall of the groove 82, thereby causing the fixing bolt 58 to slide transversely toward its retracted position.

During sliding of the fixing bolt 58, because of the depth of the groove 82 the eccentric section 80 slides longitudinally relative to the fixing bolt 58 without acting longitudinally on the fixing bolt 58.

The transmission shaft 76 and its arm forming the handle 84 are then in the position shown in FIG. 8. The fixing bolts 58 are therefore in their retracted position.

The half-mold 14 of the first mold 12 to be changed being released and loosened, the operator grasps the half-mold 14 to remove it by a first pivoting movement about its vertical axis "X" to disengage the half-mold 14 from the fixed locking lugs 52 and then movement in longitudinal translation in the forward direction of the half-mold 14 that has been pivoted in this manner.

The half-mold 14 of the replacement second mold 12 is then mounted on the mold-carrier 32 by the reverse movements of translation and then pivoting.

As each fixing bolt 58 slides from its retracted position toward its active position, the transmission shaft 76 is turned clockwise in such a manner that the eccentric section 80 bears on the interior wall of the groove 82 to cause each fixing bolt 58 to slide.

The clamping ramp 74 enables the rear face 20 of the half-mold 14 to be clamped against the bottom 40 of the recess 38, after which the blocking face 60 enables clamping.

During this operation, the peg 90 is automatically driven into its high position by the inclined plane 96. The peg 90 is then returned by spring means into its low position in the locking orifice 92 when the indexing finger 86 abuts against the shoulder face 88 of the mold-carrier 32. The fixing bolts 58 are then in their active position.

Thus the operator is able to mount and demount a half-mold 14 simply and quickly, without using additional tools.

In a variant of the invention that is not shown the rotation of the shaft is driven automatically by motorized means.

In another variant of the invention that is not shown, the locking lugs of the proximal edge of the entry of the recess are replaced by locking means with retractable bolts similar to the means just described for the distal edge. Sliding of all the fixing bolts of the proximal edge is advantageously driven by a common second transmission shaft.

In this latter variant, the recess of the mold-carrier is advantageously designed so that the half-mold is mounted in and demounted from its recess by a single movement in translation parallel to the opening of the mold formed by the two half-molds, here by a longitudinal movement. Thus the two edges of the recess are released simultaneously by the fixing bolts. It is then no longer necessary to pivot the half-mold 14 when mounting and demounting it.

In a further variant of the invention that is not shown, each bolt is formed by a trapped ball mobile in the bolt passage 66. Thus only a dome portion of the ball projects from the bolt passage when the bolt is in its active position.

The invention claimed is:

1. Molding device for a machine for producing thermoplastic material containers, by blowing or drawing-blowing a preform, the molding device including:
   two half-molds each of which is provided with a half-imprint and each of which includes a front joint face and a rear face;
   two mold-carriers each of which is provided with a recess intended to receive an associated one of said half-molds in a mounted position in which the rear face of the half mold is in contact with a bottom of the recess; and
   at least one retractable fixing bolt that is slidably mounted in at least one of said mold-carriers to slide between an active position in which said fixing bolt is extended to fix in demountable manner the associated half-mold in the mounted position clamped against the bottom of the associated recess by at least one locking face of each fixing bolt bearing against an associated fixing face of the half-mold, and a retracted position in which said fixing bolt releases the half-mold,
   each fixing bolt includes a clamping ramp that is inclined in such a manner as to press the half-mold against the bottom of the recess on sliding of said fixing bolt from said retracted position to said active position,
characterized in that the recess has an entry in a transverse plane that is delimited transversely by a vertical first edge and a vertical second edge, and in that each fixing bolt is mounted to slide transversely between said active position in which said fixing bolt projects through the entry of the recess and said retracted position in which said fixing bolt is completely retracted relative to the entry of the recess.

2. Device according to claim 1, characterized in that the sliding of each fixing bolt is driven by drive means integrated into the mold-carrier.

3. Device according to claim 2, characterized in that the drive means include:
   at least one vertical transmission shaft that is rotatably mounted in the mold-carrier; and
   means for transforming rotation movement of the transmission shaft into sliding movement of at least one of said at least one fixing bolts.

4. Device according to claim 3, characterized in that the transmission shaft is connected to at least one of said at least one fixing bolts by a cam mechanism that transforms rotation movement of the transmission shaft into sliding movement of said fixing bolt.

5. Device according to claim 4, characterized in that the transmission shaft is connected to said fixing bolt by a cam and frame mechanism.

6. Device according to claim 3, characterized in that the transmission shaft includes a pinion that cooperates with a rack of the fixing bolt to drive sliding of the fixing bolt.

7. Device according to claim 3, characterized in that the transmission shaft is a cranked shaft that is articulated to the fixing bolt by a link for transforming rotation movement of the transmission shaft into sliding movement of the fixing bolt.

8. Device according to claim 3, characterized in that the drive means include at least one handle that is intended to be actuated manually by an operator to drive sliding of each fixing bolt between said two positions.

9. Device according to claim 8, characterized in that each handle is formed by an arm that is orthogonal to the transmission shaft and is fixed to one end of the associated transmission shaft.

10. Device according to claim 3, comprising at least two fixing bolts that are slidably mounted at a border of the first edge of the entry of the recess.

11. Device according to claim 10, characterized in that sliding of all the fixing bolts of the first edge is driven by a common first transmission shaft.

12. Device according to claim 11, comprising at least one lug for locking the half mold in the mounted position that is carried in fixed manner by the mold-carrier at a border of the opposite second edge of the entry of the recess.

13. Device according to claim 11, comprising at least two other retractable fixing bolts that are slidably mounted at the border of the opposite second edge of the entry of the recess.

14. Device according to claim 13, characterized in that sliding of all the fixing bolts of the second edge is driven by a common second transmission shaft.

15. Device according to claim 1, characterized in that at least one of said at least one fixing bolts is formed by a ball.

16. Device according to claim 1, comprising a safety device that locks the fixing bolts in their active position.

17. Device according to claim 2, characterized in that the drive means include at least one handle that is intended to be actuated manually by an operator to drive sliding of each fixing bolt between said two positions.

18. Device according to claim 4, characterized in that the drive means include at least one handle that is intended to be actuated manually by an operator to drive sliding of each fixing bolt between said two positions.

19. Device according to claim 5, characterized in that the drive means include at least one handle that is intended to be actuated manually by an operator to drive sliding of each fixing bolt between said two positions.

20. Device according to claim 6, characterized in that the drive means include at least one handle that is intended to be actuated manually by an operator to drive sliding of each fixing bolt between said two positions.

* * * * *